United States Patent
Baldinger

(10) Patent No.: US 10,427,077 B2
(45) Date of Patent: Oct. 1, 2019

(54) COLLAPSIBLE PLEATED FILTER USING LATERALLY POSITIONED RETAINING MEMBERS

(71) Applicant: Columbus Industries, Inc., Ashville, OH (US)

(72) Inventor: Russell L. Baldinger, Circleville, OH (US)

(73) Assignee: Columbus Industries, Inc., Ashville, OH (US)

( * ) Notice: Subject to any disclaimer, the term of this patent is extended or adjusted under 35 U.S.C. 154(b) by 216 days.

(21) Appl. No.: 15/404,234

(22) Filed: Jan. 12, 2017

(65) Prior Publication Data

US 2018/0193783 A1   Jul. 12, 2018

(51) Int. Cl.
| | | |
|---|---|---|
| *B01D 46/00* | (2006.01) | |
| *B01D 46/52* | (2006.01) | |
| *B01D 46/10* | (2006.01) | |

(52) U.S. Cl.
CPC ..... *B01D 46/0005* (2013.01); *B01D 46/0001* (2013.01); *B01D 46/10* (2013.01); *B01D 46/521* (2013.01); *B01D 2275/203* (2013.01)

(58) Field of Classification Search
CPC ............ B01D 46/0001; B01D 46/0002; B01D 46/0005; B01D 46/0016; B01D 46/10; B01D 46/521; B01D 2275/203
See application file for complete search history.

(56) References Cited

U.S. PATENT DOCUMENTS

| | | | |
|---|---|---|---|
| 3,938,973 A | 2/1976 | Kershaw | |
| 5,133,789 A * | 7/1992 | Smith ................ | B01D 46/0002 55/491 |
| 5,968,217 A * | 10/1999 | Stein .................. | B01D 46/0002 55/496 |
| 6,592,643 B2 | 7/2003 | Shah et al. | |
| 6,599,343 B2 | 7/2003 | Frederick et al. | |
| 6,638,333 B2 | 10/2003 | Schuld et al. | |
| 6,652,613 B2 | 11/2003 | Shah et al. | |
| 6,814,773 B2 | 11/2004 | Shah et al. | |
| 7,497,888 B2 | 3/2009 | Ashwood et al. | |
| 8,157,881 B1 * | 4/2012 | Anoszko ............ | B01D 46/0005 55/497 |
| 8,414,674 B2 | 4/2013 | Anoszko et al. | |
| 9,320,998 B2 | 4/2016 | Gillilan | |
| 2009/0077937 A1 * | 3/2009 | Privitt ................ | B01D 46/0002 55/493 |
| 2012/0227366 A1 * | 9/2012 | Aycock .................. | B01D 46/10 55/422 |
| 2016/0136560 A1 | 5/2016 | Gillilan | |
| 2016/0214046 A1 * | 7/2016 | Jursich ............... | B01D 46/0005 |
| 2016/0263515 A1 * | 9/2016 | Zhang .................... | B01D 46/10 |

\* cited by examiner

*Primary Examiner* — Jason M Greene
(74) *Attorney, Agent, or Firm* — Jason H. Foster; Kremblas & Foster

(57) ABSTRACT

A collapsible HVAC filter that includes pleated filtration media having side members mounted on opposite sides of the filtration media. The filtration media collapses to reduce filter volume. Supports maintain spacing between the side members when the filtration media is expanded. The supports may extend into openings on the upstream and downstream sides of each of the side members. The collapsed filter occupies little space relative to the expanded filter, and can be expanded to form a completed filter with little effort required by the end user.

14 Claims, 8 Drawing Sheets

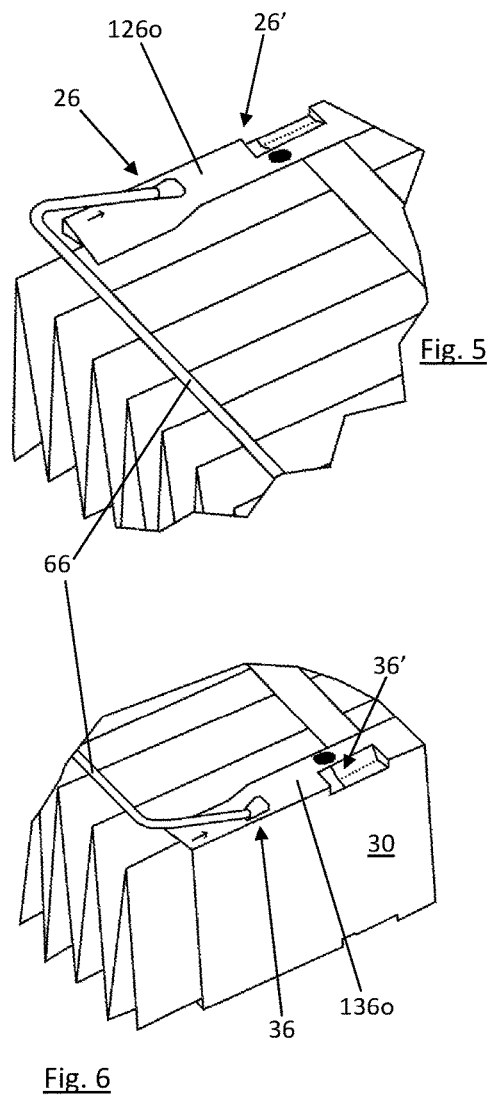
Fig. 5
Fig. 6
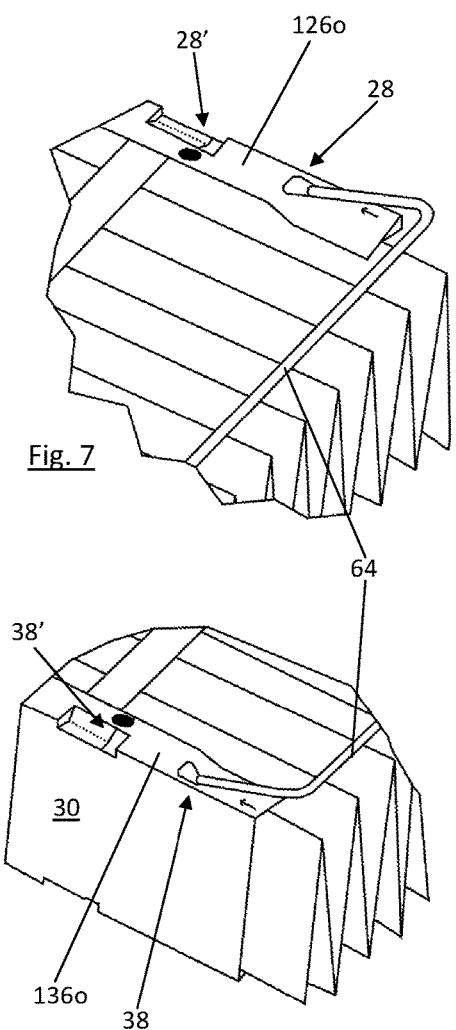
Fig. 7
Fig. 8

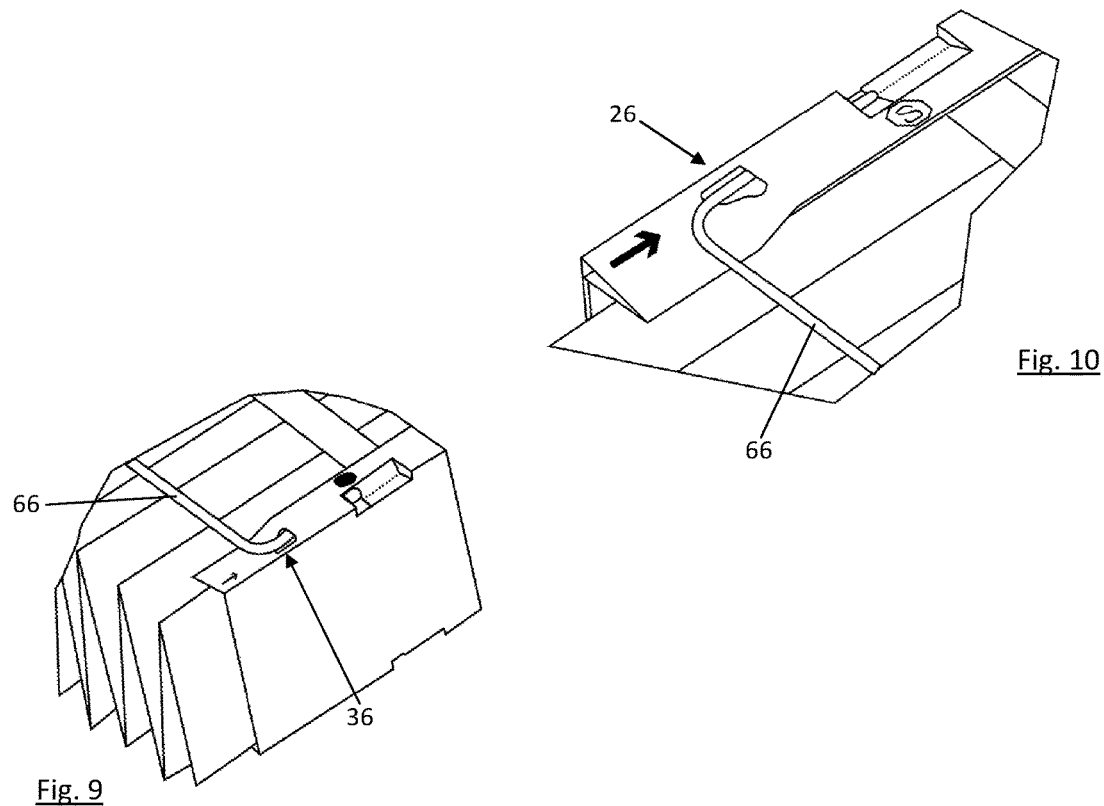
Fig. 10
Fig. 9
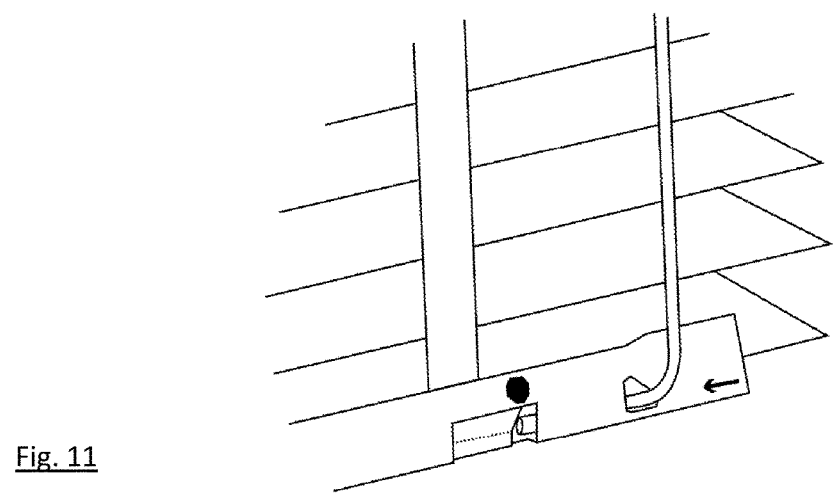
Fig. 11

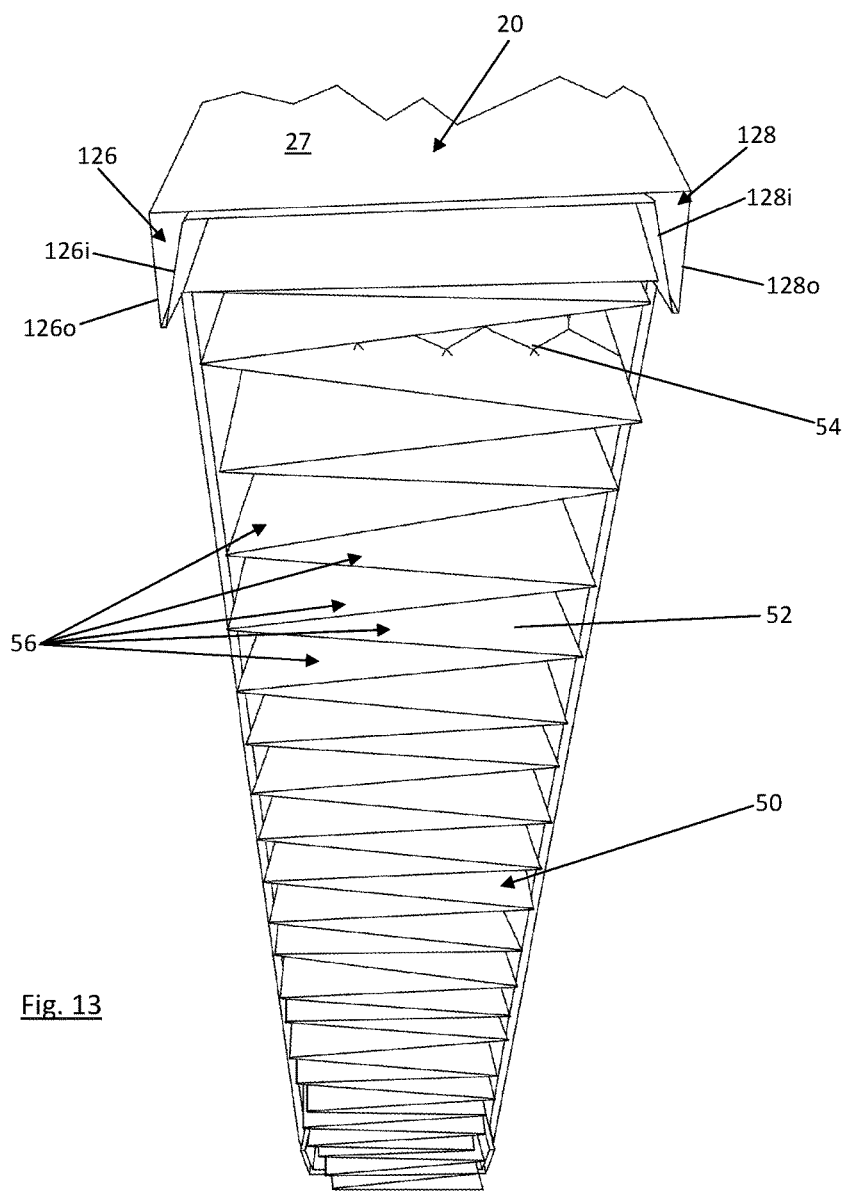
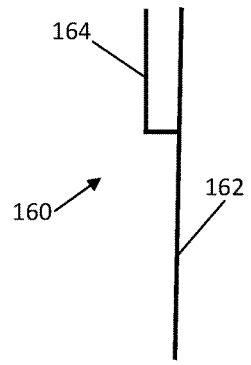
Fig. 13
Fig. 14

COLLAPSIBLE PLEATED FILTER USING LATERALLY POSITIONED RETAINING MEMBERS

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates generally to commercial and residential heating ventilation and air conditioning (HVAC) filtration, and more specifically to a filter that is collapsed to reduce volume during storage and transportation and is readily expanded by the end user before using.

Traditional pleated filters for commercial and residential HVAC systems include one or more frame members and a pleated filtration media attached within the frame members. As is known in the field, the filtration media is commonly pleated to provide greater surface area on, and greater volume in, which to collect particulate. The greater surface area and volume increases the amount of particulate it takes to clog the pores of the media, thereby prolonging the life of the filter. Furthermore, pleated media tends to be stronger than planar media in resisting deformation caused by the force of air passing through the media. However, pleated filters occupy a large volume of empty space per filter due to the shape of the pleated media. While such filters have low weight, they tend to be expensive to transport and store when considering them on a volume basis due to the large amount of empty space per unit volume.

It is known to construct filters of materials that are collapsed by the manufacturer and then expanded and assembled by end users. Such filters have significantly reduced shipping volumes, but require the end user to expand and construct the finished filter so that it can be used in a conventional manner. Conventional collapsible filters require the filter components to depart significantly from traditional non-collapsible filter components at a significant cost and/or structural disadvantage. U.S. Pat. No. 3,938,973 discloses such a prior art collapsible filter, and includes a pinch frame furnace filter that requires a combination of framing materials including heavier paperboard, expensive plastic components and/or adhesive for the end user to assemble. There is also a higher tooling cost with the plastic components, because such components lead to less flexibility on filter sizes available.

Other collapsible filters have been patented. For example, U.S. Pat. No. 9,320,998 shows a collapsible filter that is extremely useful. U.S. Pat. No. 6,652,613 discloses a collapsible filter that has a special frame into which each end of the frame is inserted to retain the expanded shape. U.S. Pat. No. 8,157,881 discloses a collapsible filter onto which special end caps are mounted to retain the filter in the expanded shape.

The need exists for an improved collapsible filter that permits an end user to expand and construct the finished product rapidly, with minimal skill requirements and without the prior art's cost disadvantages.

BRIEF SUMMARY OF THE INVENTION

A collapsible air filter is disclosed having a pleated air filter media assembly. A method of collapsing the air filter is also disclosed. The air filter media assembly has generally rectangular panels interconnected together in a pleated configuration with a first side panel at one side of the assembly and a second side panel at an opposite side of the assembly. First and second side members are mounted to opposite sides of the filtration media assembly with the first side member mounted to the first side panel and the second side member mounted to the second side panel.

At least one support is mounted at a first support end to the first side member between first and second opposing longitudinal ends of the first side member. The support is mounted at a second, opposite support end to the second side member between first and second opposing longitudinal ends of the second side member. The support maintains a space between the first and second side members to maintain the air filter in an expanded configuration.

The support preferably includes a first support that is mounted on an upstream side of the filter media to the first and second side members and a second support that is mounted on the downstream side of the filter media to the first and second side members. More preferably, the support further comprises third and fourth supports. The first support mounts on the upstream side of the filter media to the first and second side members near the first longitudinal ends of the first and second side members. The second support mounts on the downstream side of the filter media to the first and second side members near the second longitudinal ends of the first and second side members. The third support mounts on the downstream side of the filter media to the first and second side members near the first longitudinal ends of the first and second side members. The fourth support mounts on the upstream side of the filter media to the first and second side members near the second longitudinal ends of the first and second side members.

Preferred supports have two legs and a base connected to substantially form a U, and each leg preferably attaches to one of the side members. It is contemplated that each of the supports is removably mounted into openings formed in the side members. Each of the side members preferably has stops for the supports.

The filter collapses to a small portion of its original dimensions for smaller shipping and storage volume, and expands for use in an HVAC system.

BRIEF DESCRIPTION OF THE SEVERAL VIEWS OF THE DRAWINGS

FIG. 5 is a view in perspective illustrating the embodiment of FIG. 1 with supports beginning to be inserted into a second, opposite side of the side member from that shown in FIG. 4.

FIG. 6 is a view in perspective illustrating the embodiment of FIG. 1 with supports beginning to be inserted into a second, opposite side of the side member from that shown in FIG. 4.

FIG. 7 is a view in perspective illustrating the embodiment of FIG. 1 with supports beginning to be inserted into a second, opposite side of the side member from that shown in FIG. 4.

FIG. 8 is a view in perspective illustrating the embodiment of FIG. 1 with supports beginning to be inserted into a second, opposite side of the side member from that shown in FIG. 4.

FIG. 9 is a view in perspective illustrating the embodiment of FIG. 1 with a support's short leg fully inserted into a side member.

FIG. 10 is a view in perspective illustrating the embodiment of FIG. 1 with a support's short leg fully inserted into a side member.

FIG. 11 is a view in perspective illustrating the embodiment of FIG. 1 with a support's short leg fully inserted into a side member, and illustrating the stop.

FIG. 13 is an end view in perspective illustrating the expanded filter of FIG. 12 in an operable position within a filter housing.

FIG. 14 is a schematic view illustrating an alternative support.

Figure 1:
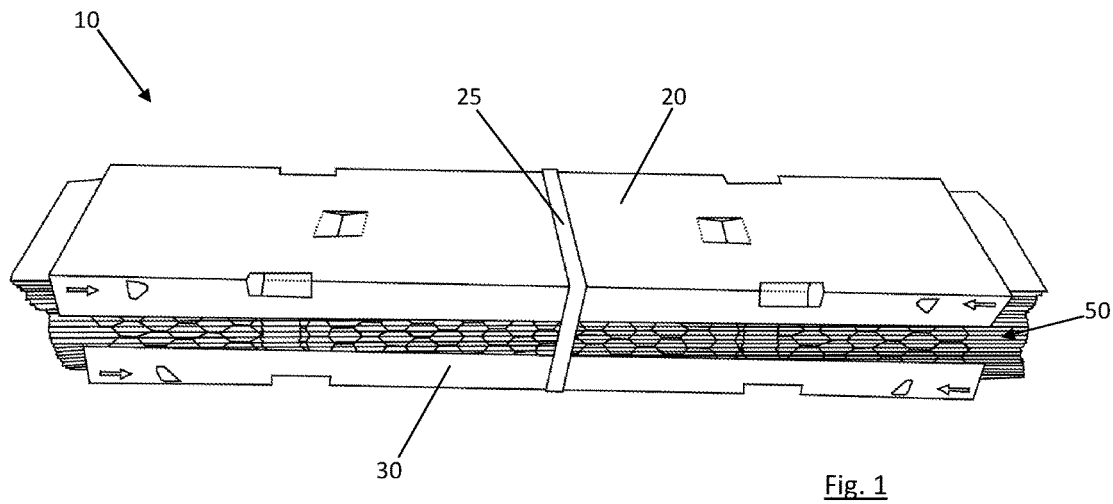
FIG. 1 is a side view in perspective illustrating a preferred embodiment of the present invention in a collapsed or compressed state as held by a fastener.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word "connected" or terms similar thereto are often used. They are not limited to direct connection, but include connection through other elements where such connection is recognized as being equivalent by those skilled in the art.

DETAILED DESCRIPTION OF THE INVENTION

Figure 2:
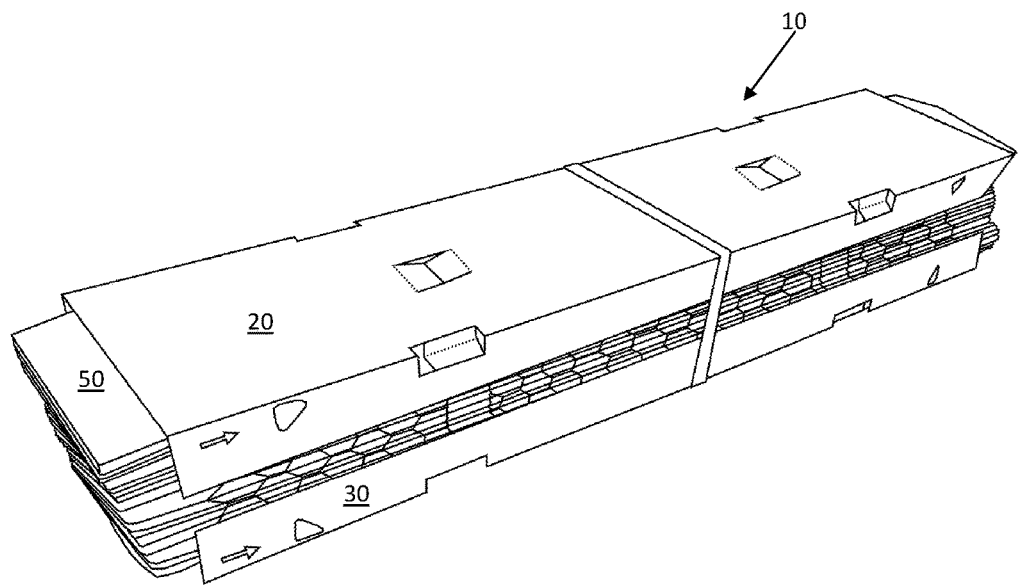
FIG. 2 is a view in perspective illustrating the embodiment of FIG. 1.

An embodiment 10 is shown in FIGS. 1 and 2 having a first side member 20, a second side member 30 and a filtration media 50. Opposite filtration media 50 sides are mounted to the first side member 20 and the second side member 30. The embodiment 10 is shown in FIGS. 1 and 2 in a collapsed (or compressed) state in which the first and second side members 20 and 30 are held close to one another with the filtration media 50 compressed therebetween. The first and second side members 20 and 30 may be held close to one another by any structure that is mechanically suitable, and could include a rubber band 25, a zip-tie, plastic wrap enclosing part of or the entire embodiment 10, or any equivalent structure. The collapsed state is preferred for storing and transporting the embodiment 10, because the embodiment 10 occupies the least volume in this state.

The first and second side members 20 and 30 are substantially rigid, and this characteristic permits the side members 20 and 30 to support the force of the filtration media 50 pulling on the side members 20 and 30 without the side members 20 and 30 flexing more than a few millimeters along their entire lengths. The side members 20 and 30 may be made of paperboard, plastic, metal, composite or any other suitably rigid material. In a preferred embodiment, the side members 20 and 30 are made of chipboard or paperboard that is U-shaped in cross section, and are substantially identical to one another. The side member 20 is shown in FIG. 13 having angled legs on opposite sides of a side member panel 27. The legs are preferably formed from folded paperboard panels 126$i$, 126$o$, 128$i$ and 128$o$, which extend substantially perpendicularly from opposite lateral edges of the wide side member panel 27. One leg is defined by the inner and outer legs 126$i$ and 126$o$, and another leg is defined by the inner and outer legs 128$i$ and 128$o$. The inner and outer legs are spaced apart to form cavities 126 and 128 therebetween.

The filtration media 50 is a flexible, pleated material, such as that described in U.S. patent application Ser. No. 14/940,914, which has been published as United States Patent Application Publication No. US 2016/0136560. This published application is hereby incorporated by reference. The flexible pleated material may include one or more filtration media layers 52 (see FIG. 13) that are bonded to one or more support layers 54 that provide no substantial filtration effect but cause the filtration media 50 to resist deformation during use. Such support layers are known in the technology to hold the shape of pleated filtration media when gas is forced through the filtration media layer 52 and may be made of metal wire, plastic netting, coarse glass fibers or any other suitable backing layer. The opposite sides of the filtration media 50 are preferably attached, such as by fasteners (e.g., staples, stitching, brads, etc.) or adhesive to the side members 20 and 30. The filtration media 50 is pleated to form a conventional alternating pattern of filtration media panels 56 (FIG. 13), each joined at adjacent edges. Such a plurality of panels 56 may be compacted by a force applied along a line that extends transverse (and preferably perpendicular) to the support member panel 27, thereby moving all panels 56 into a substantially parallel orientation relative to all other panels 56 and the side members 20 and 30 (shown in FIGS. 1 and 2). Expanding the filtration media 50 can be accomplished by an oppositely-directed force along the same line after releasing the compressive force, such as by cutting the rubber band 25.

The pleated filtration media 50 may be a synthetic nonwoven filtration media having a thickness less than one-eighth inch, a Frazier air permeability greater than about 100 cubic feet per minute (CFM) and a basis weight of from 30 to 120 grams per square meter. Of course, a person having ordinary skill in the field will understand that any suitable filtration media can be substituted for the preferred media with attendant benefits and disadvantages. The pleated media preferably has a conventional reinforcement layer 54 to retain the pleated shape after pleating, and also to provide support to prevent the filtration media from "blowing out" of the filter frame during use. The reinforcement layer 54 may be a conventional pleating reinforcement, such as slit and expanded metal or plastic, but it could also be netting, "chicken wire" or any conventional support layer. Alternatively, self-supporting pleatable material can be used.

Figure 3:
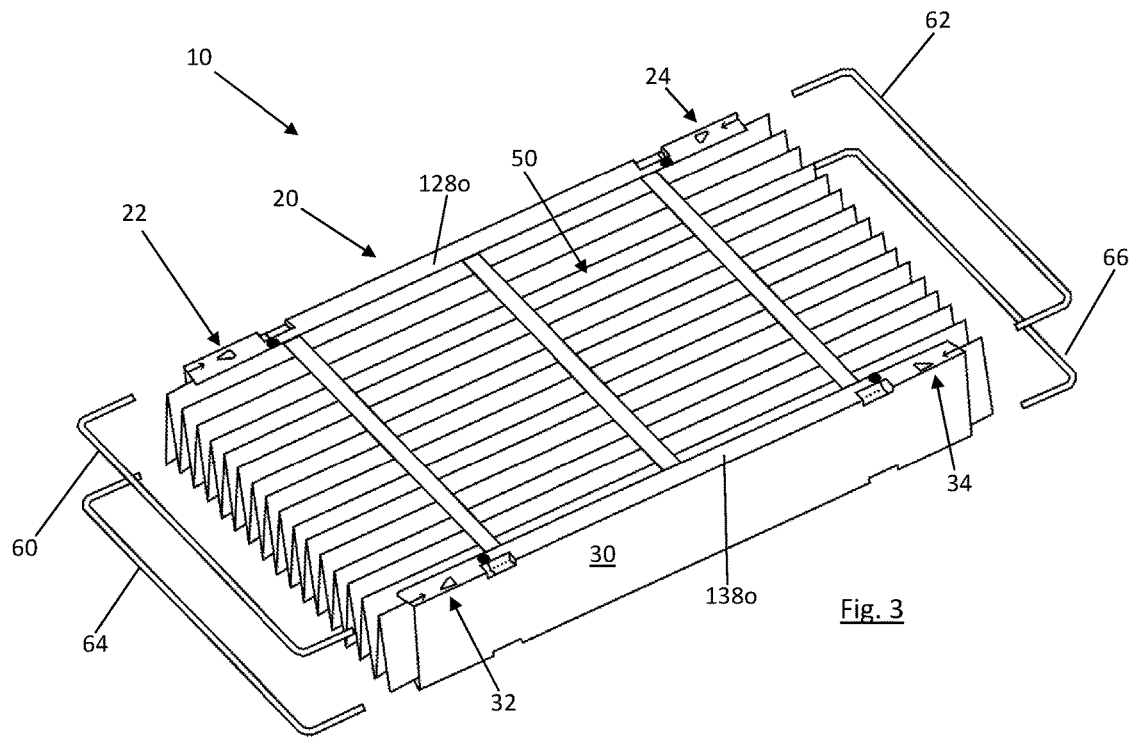
FIG. 3 is a view in perspective illustrating the embodiment of FIG. 1 with the pleated media assembly released from the fastener and with supports aligned to be attached to the side members.
Figure 4:
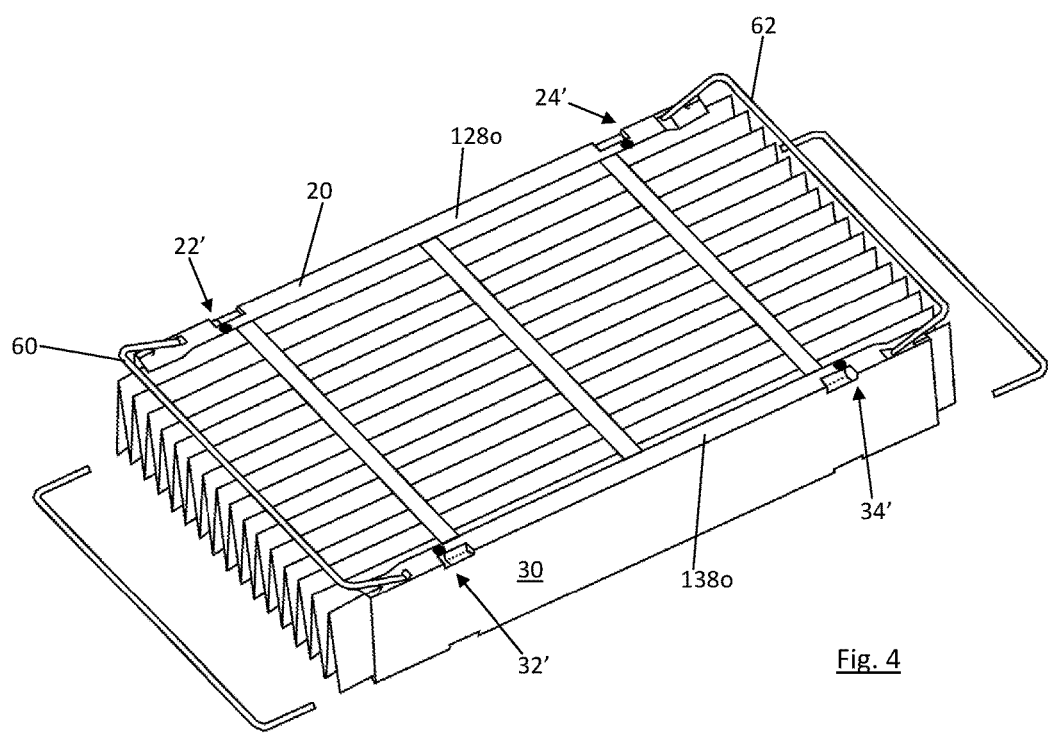
FIG. 4 is a view in perspective illustrating the embodiment of FIG. 1 with supports beginning to be inserted into one side of the side members.
Figure 12:
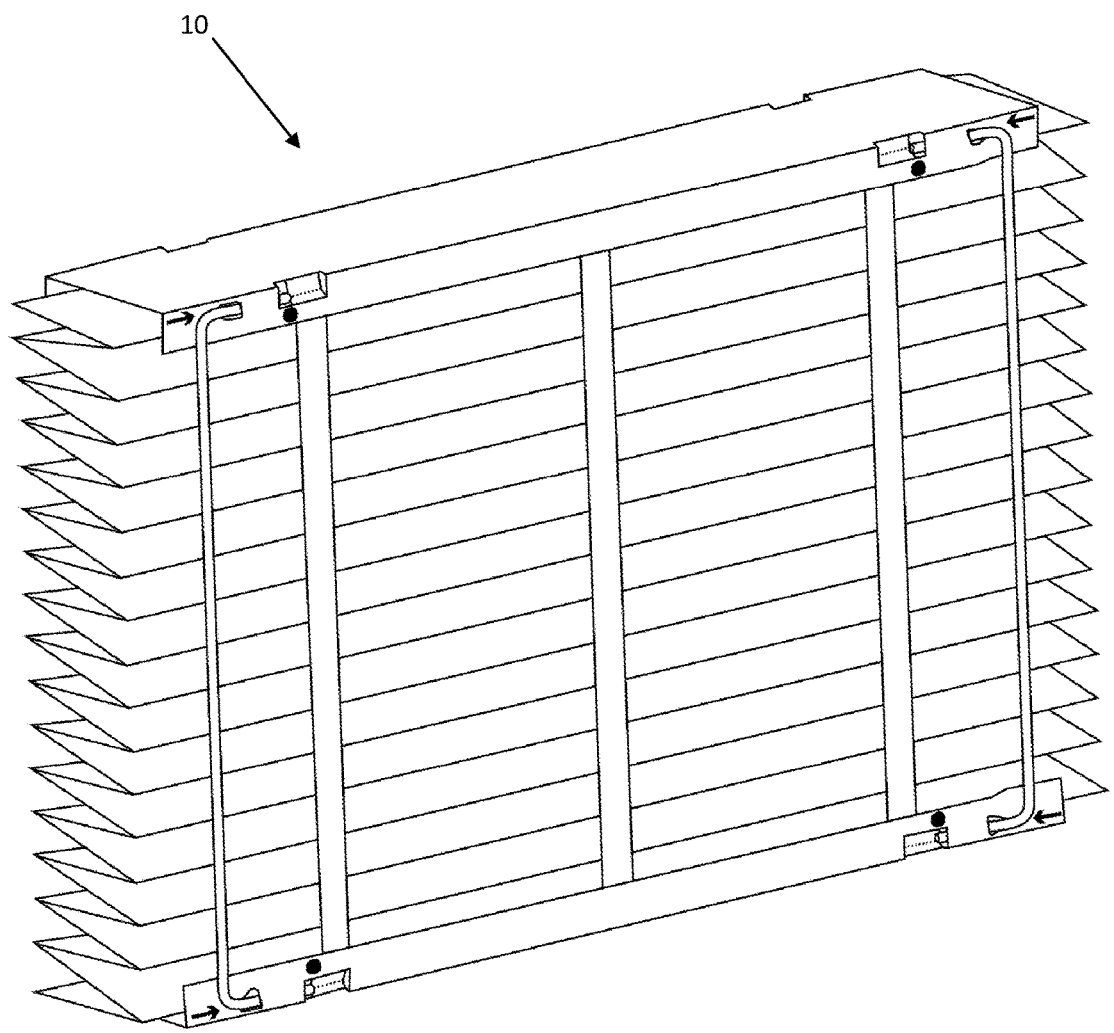
FIG. 12 is a view in perspective illustrating the expanded filter fully assembled.

In FIGS. 3 and 4, the embodiment 10 is shown expanded. The rubber band 25 or other fastener was removed, thereby permitting the collapsed filtration media 50 to expand outwardly to a state in which the side members 20 and 30 are not as close together as when they were in the collapsed state. The pleated filtration media 50 has a spring effect due to at least the reinforcing layer 54. When the rubber band 25 or any equivalent structure is removed, the filtration media 50 tends to expand to an unforced or "relaxed" shape shown in FIG. 17. Next, the side members 20 and 30 are manually forced away from one another, such as by grasping the side members 20 and 30 and pulling them by hand. Because of the spring effect of the filtration media 50, when the side members 20 and 30 are forced away from one another beyond the unforced or relaxed shape, the side members 20 and 30 are biased back toward the unforced shape. This spring effect creates a bias on any structure, such as the supports 60, 62, 64 and 66, that are mounted to the side members 20 and 30 to hold the side members 20 and 30 in position when the side members 20 and 30 are manually forced away from one another from the unforced state.

Figure 17:
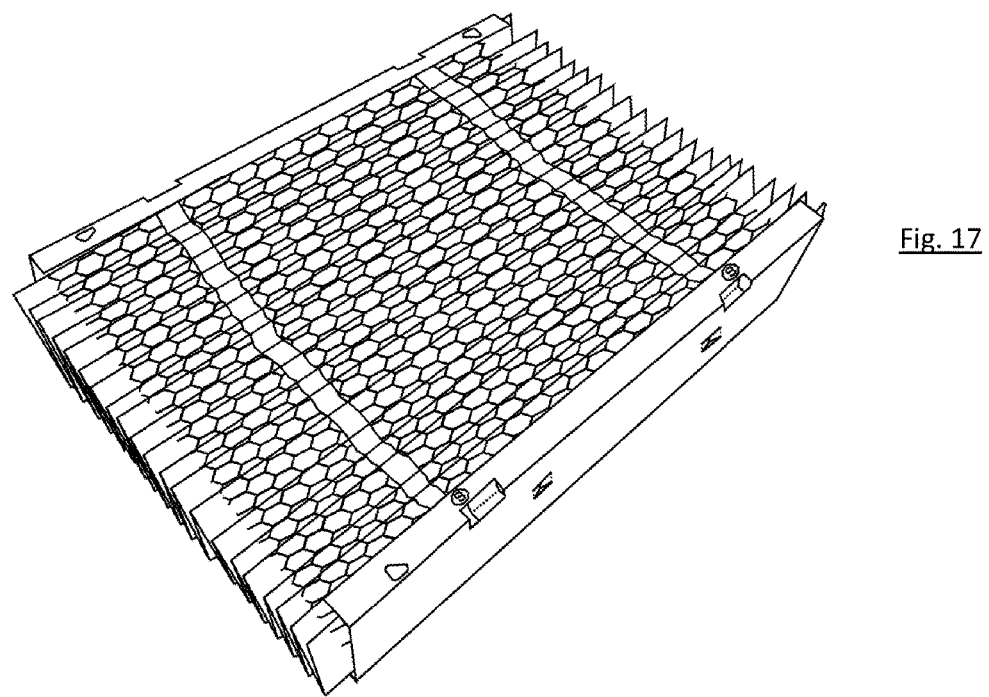
FIG. 17 is a view in perspective illustrating the embodiment of FIG. 1 with the pleated media assembly released from the fastener and in a "relaxed" or unrestrained state.

As shown in FIGS. 3 and 4, each of the supports 60-66 is generally U-shaped with a long base and two shorter legs disposed at an angle of about 90 degrees from the base. The supports may be made of metal, plastic, composite or any suitable material. One-eighth inch diameter plain steel wire is contemplated, but because the force required to expand the embodiment 10 is less than about one pound, nearly any structural plastic or metal material would suffice. Each of the supports 60-66 is longer than the distance between the side members 20 and 30 when the embodiment 10 is in the unforced shape (FIG. 17). When the side members 20 and 30 are forced away from one another, the laterally-positioned supports 60-66 hold the side members 20 and 30 at a distance determined by the length of the supports.

The supports 60-66 are mounted to the lateral edges of the side members 20 and 30, preferably near opposite ends and on opposite (upstream and downstream) sides of the side members 20 and 30. In a preferred embodiment, the short legs of the supports 60 and 62 are inserted into the holes 22, 24, 32 and 34 formed in the outer legs 128o and 138o of the side members 20 and 30, respectively, as shown in FIGS. 3 and 4. Substantially identical holes are formed on opposite outer legs of the side members 20 and 30, but are not visible in FIGS. 3 and 4, and these holes receive the short legs of the supports 64 and 66, as shown in FIGS. 5 through 11.

The insertion of the short legs is shown, at its beginning in FIG. 4, where the support 60 has its short legs angled relative to the length of the outer legs 128o and 138o, and being first inserted in the holes 22 and 32 of the side members 20 and 30, respectively. By forcing the short legs into their respective holes farther, the tips of the shorts legs insert into cavities, such as the cavity 128 and a similar cavity formed within the side member 30 until the tips of the supports 60 and 62 seat against stops 22', 24', 32' and 34' (see FIG. 4) formed adjacent the corresponding holes 22 and 32. The stops 22' and 32' may be formed by cutting and folding a section of the material of which the outer legs 128o and 138o are made into the respective cavity 128 and equivalent cavity in the side member 30 behind the outer leg 138O. Upon full insertion into the holes 22 and 32, the short ends of the supports 60 are held by friction as the short ends seat against the panels 128i and 128o in the side member 20 (and similar panels in the side member 30). This "friction fit" is enhanced by the force of the filtration media 50 pulling the side members 20 and 30 back toward one another.

A similar procedure is followed to install the supports 64 and 66 into the opposite sides of the side members 20 and 30 from those shown in FIGS. 3 and 4. This is illustrated in FIGS. 5-11, where the supports 64 and 66 are shown with the short legs of the supports 64 and 66 inserted into the holes 26, 28, 36 and 38 formed in the outer legs 126o and 136o of the side members 20 and 30, respectively. The insertion of the short legs is shown, at its beginning in FIGS. 5-8, where the supports 64 and 66 are shown with their short legs angled relative to the lengths of the outer legs 126o and 136o in which the holes 26, 36, 28 and 38 are formed. By forcing the short legs into the respective holes farther, the tips of the shorts legs insert into cavities formed within the side members 20 and 30 until the tips of the supports 64 and 66 seat against stops 26', 28', 36' and 38' formed adjacent each of the holes 26, 28, 36 and 38, respectively. The stops 26', 28', 36' and 38' are preferably structures that extend across the voids into which the short ends of the supports 60-66 are inserted. Upon full insertion into the holes 26, 28, 36 and 38, the short ends of the supports are held by friction as the short ends seat against the panels that make up the short legs in the supports 20 and 30.

As noted above, the supports 60-66 are mounted to the opposite (upstream and downstream) sides, at or near the opposite longitudinal ends of, the side members 20 and 30. This positioning causes the side members 20 and 30 to support the inwardly-directed force of the filtration media 50 over a span of about, or just less than, the length of the side members 20 and 30. Of course, the supports 60-66, or any other supports, may be mounted anywhere along the length of the side members 20 and 30. It is preferred that the supports be spaced similar distances from the ends and on opposite (upstream and downstream) sides of the side members 20 and 30, but this is not critical. It is contemplated to mount the supports at points about one-third of the way in from one end, and at about one-third of the way in from the opposite end, thereby minimizing the length of any span of the side members 20 and 30 between supports. In all embodiments of the present invention, the supports are not mounted at the ends of the side members 20 and 30, but rather within the length of the side members 20 and 30. End mounting is not excluded but is contemplated. At least one support is needed, more preferably two supports are used, and most preferably the four supports 60-66 are used as described above.

The supports may mount in the sides of the side members 20 and 30 as shown herein, but it is also contemplated to mount side members to the wide panels of the side members 20 and 30, such as by extending short legs of the supports 60-66 into voids formed in structures on the wide panels. It is also contemplated that supports do not insert into the side members 20 and 30, but are simply positioned between the side members 20 and 30 on opposite sides. One end 160 of such a support is shown in FIG. 14 having a main leg 162 that extends from one side member to the other and a finger 164 that extends outwardly from the main leg 162 into which the outer panel 128o or another outer panel may be inserted. With a similar structure at the opposite end of the main leg 162 into which the opposite outer support panel 138o may be inserted, such a support maintains the spacing of the side members 20 and 30 without insertion into the side members 20 and 30.

The force of the media 50 pulling the side members 20 and 30 toward one another aids in frictionally holding the supports 60-66 within their respective cavities. The supports 60-66 thereby retain the side members 20 and 30 in the position desired, and do not fall out of the side members 20 and 30 after expansion due at least in part to the compressive force exerted on the supports 60-66 by the spring effect of the filtration media 50. Once the filter is completely expanded, it has the appearance of the embodiment 10 shown in FIGS. 12 to 15.

Figure 15:
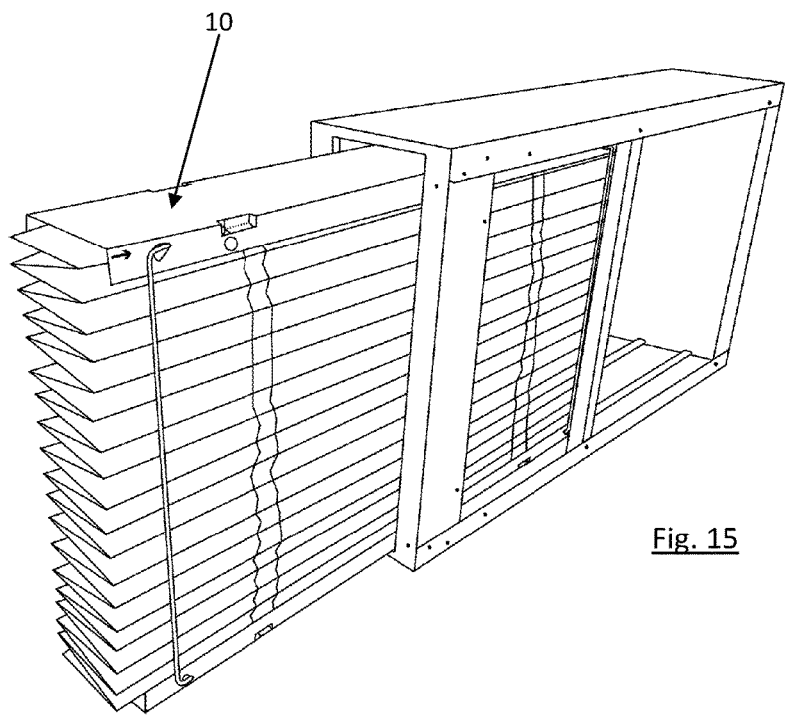
FIG. 15 is a view in perspective illustrating the preferred embodiment in a filter housing.
Figure 16:
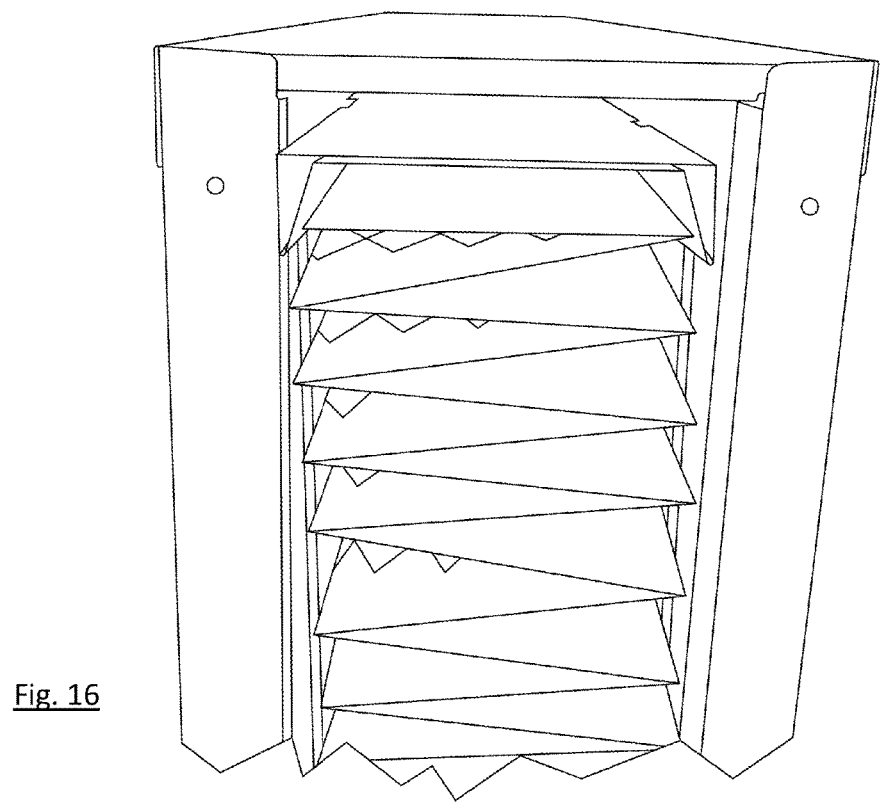
FIG. 16 is an end view in perspective illustrating the preferred embodiment in a filter housing.
Figure 18:
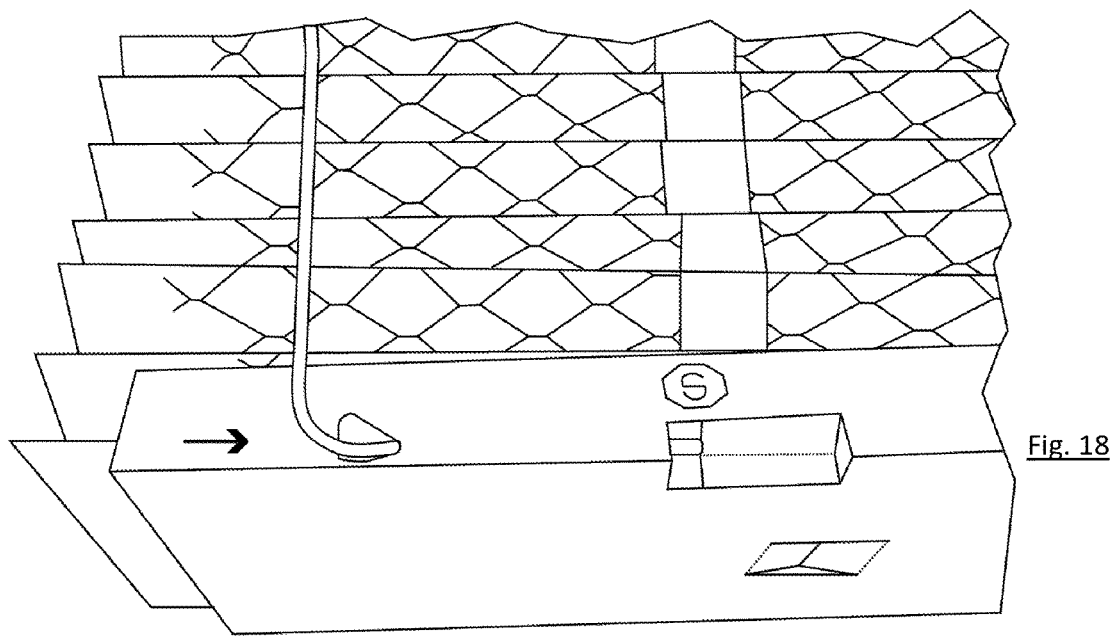
FIG. 18 is a close-up view illustrating the stop.

The expanded configuration of the embodiment 10 may be inserted into any HVAC filter frame that can hold a conventional box filter of a size similar to the expanded embodiment 10. The embodiment 10 may also be modified in thickness, length, and width to fit conventional HVAC filter frames. Therefore, the embodiment 10 shown in FIG. 12 may be slid into conventional box filter frame housings similar to those shown in FIGS. 15 and 16. Furthermore, the expanded embodiment 10 may be inserted into other frame housings that are made for special filters, such as those shown in U.S. Pat. Nos. 8,157,881; 6,592,643; 6,652,613; 6,638,333; 6,814,773; and 6,599,343. Advantageously, the expanded embodiment 10 may be inserted into voids designed for specialized filters, but without requiring the specialized structures of such filters. Thus, as shown in FIGS. 15-16, the expanded embodiment 10 is inserted into a frame designed for an APRILAIRE brand filter or an EZFLEX brand filter, but without the special structures previously required for use with these branded filters. The side members 20 and 30 simply slide against these special filter housings when the expanded embodiment is inserted. The HVAC unit in which the expanded embodiment 10 is installed is used in a conventional manner.

Once the expanded embodiment 10 has reached its lifespan, it is preferably removed from the frame and discarded or recycled, and then replaced with a new, identical filter. It is contemplated to re-use the supports 60-66 from the used filter in the new filter, once they are appropriately cleaned. Alternatively, these supports 60-66 may be recycled or discarded. The embodiment 10 may be collapsed to occupy less space when discarded. A fastener of any suitable kind may be used to maintain a used filter in the collapsed state.

The supports 60-66 described herein are of a length that is substantially equal to the distance between the apertures in the side members 20 and 30 when the side members 20 and 30 are pulled apart a specified distance. This distance may be 20 inches in the embodiment 10, but other embodiments may be constructed in which the specified distance is more or less than this distance in order for the embodiment to fit a specified size filter housing. It is contemplated that each embodiment may have supports that maintain the side members at the specified distance for the embodiment. It is also contemplated that multiple sets of different lengths of supports may be used with a particular embodiment. For example, it is contemplated that four supports 60-66 having a length of 20 inches are included with the embodiment 10. As an alternative, eight supports may be included with the embodiment 10, where the four supports 60-66 are 20 inches long, but the other four supports are 19 inches long. In such an example, the second set of four supports defines a finished filter that is not as wide as the embodiment 10 shown in FIG. 12, but which works reasonably well. This feature of having the ability to use different sets of supports of different lengths per set permits the finished filter to have multiple finished sizes, which provides even greater flexibility for end users and installers.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A collapsible air filter comprising:
   (a) a pleated air filter media assembly having generally rectangular panels interconnected together in a pleated configuration with a first side panel at one side of the assembly and a second side panel at an opposite side of the assembly;
   (b) first and second side members, the first side member mounted to the first side panel and the second side member mounted to the second side panel, wherein:
      (i) a first cavity is formed between inner and outer legs on an upstream side of the first side member;
      (ii) a second cavity is formed between inner and outer legs on an upstream side of the second side member;
      (iii) a third cavity is formed between inner and outer legs on a downstream side of the first side member;
      (iv) a fourth cavity is formed between inner and outer legs on a downstream side of the second side member; and
   (c) at least one support inserted at a first support end in the first cavity, said at least one support inserted at a second, opposite support end in the second cavity, said at least one support maintaining a space between the first and second side members.

2. The collapsible air filter in accordance with claim 1, wherein said at least one support further comprises:
   (a) a first support mounted on an upstream side of the filter media to the first and second side members; and
   (b) a second support mounted on a downstream side of the filter media to the first and second side members.

3. The collapsible air filter in accordance with claim 1, wherein said at least one support further comprises:
   (a) a first support inserted in the first and second cavities near the first longitudinal ends of the first and second side members;
   (b) a second support inserted in the first and second cavities near second longitudinal ends of the first and second side members;
   (c) a third support inserted in the third and fourth cavities near the first longitudinal ends of the first and second side members; and
   (d) a fourth support inserted in the third and fourth cavities near the second longitudinal ends of the first and second side members.

4. The collapsible air filter in accordance with claim 3, wherein each of the supports has two fingers and a base connected to substantially form a U, and wherein each finger inserts in a respective one of the cavities.

5. The collapsible air filter in accordance with claim 4, wherein each of the supports is removably mounted into openings formed in the respective outer legs of the side members.

6. The collapsible air filter in accordance with claim 4, wherein each of the side members has longitudinal stops, each stop defining an insertion limit for a support.

7. The collapsible air filter in accordance with claim 6, wherein each of the stops is formed in the side members by extending a structure across a respective cavity into which a support is inserted.

8. A method of constructing an air filter, the method comprising the steps of:
  (a) providing a pleated air filter media assembly having generally rectangular panels interconnected together in a pleated configuration with a first side panel attached to a first side member at one side of the assembly, and a second side panel attached to a second side member at an opposite side of the assembly;
  (b) inserting at least one support at a first support end in a first cavity that is formed on an upstream side of the first side member between inner and outer legs thereof; and
  (c) inserting said at least one support at a second, opposite support end in a second cavity that is formed on an upstream side of the second side member between inner and outer legs thereof, said at least one support maintaining a space between the first and second side members.

9. The method in accordance with claim 8, wherein the step of inserting at least one support further comprises:
  (a) inserting a first support in the first and second cavities;
  (b) inserting a first end of a second support in a third cavity that is formed on a downstream side of the first side member between inner and outer legs of the first side member; and
  (c) inserting a second end of the second support in a fourth cavity that is formed on a downstream side of the second side member between inner and outer legs of the second side member.

10. The method in accordance with claim 8, wherein the step of inserting at least one support further comprises:
  (a) inserting a first support in the first and second cavities near first longitudinal ends of the first and second side members;
  (b) inserting a first end of a second support in a third cavity that is formed on a downstream side of the first side member between inner and outer legs of the first side member near second longitudinal ends of the first and second side members;
  (c) inserting a second end of the second support in a fourth cavity that is formed on a downstream side of the second side member between inner and outer legs of the second side member;
  (d) inserting a third support in the first and second cavities near the second longitudinal ends of the first and second side members; and
  (e) inserting a fourth support in the third and fourth cavities near the first longitudinal ends of the first and second side members.

11. The method in accordance with claim 10, wherein each of the steps of inserting the supports further comprises removably inserting one of two support fingers, each of which is connected to a base to form one of the supports, into a corresponding finger-receiving aperture formed in a respective outer leg of each of the side members.

12. The method in accordance with claim 11, further comprising inserting each of the support fingers into the respective finger-receiving aperture until the finger abuts a stop.

13. The collapsible air filter in accordance with claim 1, wherein the cavities extend along the side members' length.

14. The method in accordance with claim 8, wherein the direction of inserting of each support is along the side members' length.

* * * * *